US012551079B2

(12) United States Patent
Baumgart et al.

(10) Patent No.: US 12,551,079 B2
(45) Date of Patent: Feb. 17, 2026

(54) COMBINED CLEANING AND WRINGING SYSTEM FOR A MOPPING DEVICE

(71) Applicant: CARL FREUDENBERG KG, Weinheim (DE)

(72) Inventors: Daniel Baumgart, Naperville, IL (US); Uwe Dingert, Abtsteinach (DE); Christian Kalt, Fuerth (DE)

(73) Assignee: CARL FREUDENBERG KG, Weinheim (DE)

(*) Notice: Subject to any disclaimer, the term of this patent is extended or adjusted under 35 U.S.C. 154(b) by 441 days.

(21) Appl. No.: 18/043,736

(22) PCT Filed: Aug. 18, 2021

(86) PCT No.: PCT/EP2021/072913
§ 371 (c)(1),
(2) Date: Mar. 2, 2023

(87) PCT Pub. No.: WO2022/048907
PCT Pub. Date: Mar. 10, 2022

(65) Prior Publication Data

US 2023/0337889 A1 Oct. 26, 2023

(30) Foreign Application Priority Data

Sep. 4, 2020 (DE) ..................... 10 2020 123 173.3

(51) Int. Cl.
*A47L 13/58* (2006.01)
*A47L 13/256* (2006.01)
(Continued)

(52) U.S. Cl.
CPC ............. *A47L 13/58* (2013.01); *A47L 13/256* (2013.01); *B08B 3/02* (2013.01); *F04B 9/02* (2013.01); *B08B 2203/027* (2013.01)

(58) Field of Classification Search
CPC ................................ A47L 13/58; A47L 13/59
(Continued)

(56) References Cited

U.S. PATENT DOCUMENTS 4,798,307 A 1/1989 Evrard
2018/0279849 A1 10/2018 Dingert

FOREIGN PATENT DOCUMENTS

CN 201675888 U 12/2010
CN 107456180 A * 12/2017 ........... A47L 13/258
(Continued)

OTHER PUBLICATIONS

Translation of CN108125642 (Year: 2018).*
(Continued)

*Primary Examiner* — Tom Rodgers
(74) *Attorney, Agent, or Firm* — LEYDIG, VOIT & MAYER, LTD.

(57) ABSTRACT

A combined cleaning and wringing system, including a mopping device including a cleaning textile to be cleaned and wrung, a cleaning station, and a wringing station. The cleaning station and the wringing station are spatially combined in a housing and the cleaning station includes a cleaning fluid tank filled with a cleaning fluid, a pump and at least one spray head. The cleaning fluid tank, the pump and the spray head are in fluid communication and the wringing station includes at least one scraper having at least one scraper lip, across which the cleaning textile can be passed. The cleaning station and the wringing station are functionally separate, in that the cleaning fluid tank is only associated with the cleaning station, the wringing station includes a wastewater tank only associated with the wringing station, and there is no fluid communication between the wastewater tank and the cleaning fluid tank.

18 Claims, 4 Drawing Sheets

(51) Int. Cl.
*B08B 3/02* (2006.01)
*F04B 9/02* (2006.01)

(58) Field of Classification Search
USPC ..................... 15/116.1, 119.1, 260, 261, 262
See application file for complete search history.

(56) References Cited

FOREIGN PATENT DOCUMENTS

| | | | | | |
|---|---|---|---|---|---|
| CN | 108125642 | A | * | 6/2018 | ............. A47L 13/58 |
| CN | 108261155 | A | * | 7/2018 | ........... A47L 13/254 |
| CN | 208808400 | U | | 5/2019 | |
| CN | 109998435 | A | * | 7/2019 | ............. A47L 13/59 |
| CN | 111265164 | A | * | 6/2020 | ............. A47L 13/58 |
| CN | 211324802 | U | | 8/2020 | |
| CN | 211324810 | U | | 8/2020 | |
| DE | 102014017559 | B3 | | 1/2016 | |
| EP | 1219226 | B1 | | 8/2013 | |
| EP | 3446613 | A1 | | 2/2019 | |
| EP | 3620096 | A1 | | 3/2020 | |

OTHER PUBLICATIONS

Translation of CN-109998435-A (Year: 2019).*
Translation of CN-111265164-A (Year: 2020).*
Translation of CN-107456180-A (Year: 2017).*
Translation of CN-108261155-A (Year: 2018).*

* cited by examiner

COMBINED CLEANING AND WRINGING SYSTEM FOR A MOPPING DEVICE

CROSS REFERENCE TO RELATED APPLICATIONS

This application is a U.S. National Phase application under 35 U.S.C. § 371 of International Application No. PCT/EP2021/072913, filed on Aug. 18, 2021, and claims benefit to German Patent Application No. DE 10 2020 123 173.3, filed on Sep. 4, 2020. The International Application was published in German on Mar. 10, 2022 as WO 2022/048907 A1 under PCT Article 21(2).

FIELD

The invention relates to a combined cleaning and wringing system, a mopping device comprising a cleaning textile to be cleaned and to be wrung, a cleaning station, and a wringing station.

BACKGROUND

A cleaning and wringing system is known from CN 108 261 155 A.

The cleaning and wringing station are not only spatially but also functionally combined in a unit. The cleaning and wringing station have a single common slot comprising a single common inlet for the mopping device. The common slot opens out into a common tank formed as a combined cleaning fluid and wastewater tank.

When the combined cleaning and wringing system is first put into operation, there will only be clean cleaning fluid in the common tank. After each wringing of the cleaning textile by the scraper lip of the scraper, scraped and dirty wastewater will flow back into the common tank and will increasingly soil the cleaning fluid.

In the use of the prior-art cleaning and wringing system, first the mopping device to be cleaned and to be wrung is folded in parallel against its handle and has an end side introduced into the common slot of the cleaning station and the wringing station in the longitudinal direction of the cleaning textile for cleaning. By introducing the mopping device into the slot, a mechanical pump is activated, and cleaning fluid from the common tank is sprayed by nozzles onto the surface of the cleaning textile to be cleaned. Subsequently, the mopping device is withdrawn from the slot in the opposite direction. In the process, a scraper lip arranged in the slot in the vicinity of the inlet, scrapes liquid from the cleaning textile. It should be considered, however, that the scraped-off and soiled liquid from the cleaning textile collects in the common tank of the cleaning station and the wringing station. The more frequently the cleaning device is first cleaned and then wrung, the more the fluid in the tank will be soiled. By the fact that this increasingly soiled fluid is sprayed onto the cleaning textile to clean the mopping device, the cleaning action will become increasingly less efficient; the cleaning textile will remain soiled even after cleaning.

Moreover, it is disadvantageous that a cleaning process always has to be followed by a wringing process and that a wringing process always has to be followed by a cleaning process. This makes it impossible, for example, to clean more strongly soiled cleaning textiles several times in succession without having to wring them in between. Also, there is no possibility of carrying out several successive wringing processes, for example, when the cleaning textile has excessive residual moisture after a first wringing process. As soon as the mopping device is introduced into the single slot, the cleaning textile will be sprayed automatically with the fluid from the tank. The scraper in the wringing station is adjustable in width. This can influence the scraping action. The prior-art system has only one fluid circuit which is closed and in which the initially clean cleaning fluid gets increasingly mixed with the soiled wastewater the longer the system is in use.

A further cleaning and wringing system is known from EP 1 219 226 B1. The cleaning and wringing system comprises a flat mop comprising a cleaning textile to be cleaned and to be wrung, and a cleaning station and a wringing station arranged in a functional series connection and spatially combined in a single unit.

The cleaning station and the wringing station of this system also have a common tank. To prevent the cleaning textile from being cleaned by cleaning fluid soiled by wastewater, various filters are arranged in the common tank.

The flat mop is introduced into the cleaning station in a horizontal orientation, passed through the cleaning station into the wringing station and then removed from the wringing station. In the cleaning station, the cleaning textile is sprayed with cleaning fluid from below, essentially vertically upwards, wherein the spray pressure is generated by an electrically operated pump.

Subsequently, the mopping device is passed through the wringing station by electrically driven rolls, wherein cleaning fluid is pressed out of the cleaning textile in the wringing station. As a consequence of the electrically operated pump in the cleaning station and the electrically driven rolls in the wringing station the prior-art system will always have to rely on an electrical energy source. The manufacture and the operation of the system are thus not very satisfactory from a manufacturing and economic point of view.

From DE 10 2014 017 559 B3, a further cleaning and wringing system is known, wherein the mopping device to be cleaned and to be wrung is formed as a fringed mop. The cleaning station and the wringing station are functionally combined. The cleaning station comprises a freshwater tank from which the cleaning fluid passes to the cleaning textile via a check valve. In the process, the mopping device is pressed into a wringing basket, this opens the check valve and the cleaning fluid flows under the effect of gravity from the freshwater tank onto the cleaning textile for cleaning. An electrical or mechanical pump, which would have to be separately manufactured and installed, is not necessary.

The cleaning fluid used for cleaning the cleaning textile is always free of soiling. After cleaning, the cleaning textile is wrung in the rotating wringing basket. Fluid that is flung out is removed radially outwardly through recesses in the basket and collected in a wastewater collection region of a bucket used together with the cleaning and wringing system.

From EP 3 446 613 A1, a cleaning and wringing system for a mopping device is known. The mopping device is formed as a flat mop. The cleaning station and the wringing station are combined in a functional unit. The mopping device with the cleaning textile fitted over it is first dipped into a cleaning container filled with cleaning fluid through a first slot of the cleaning station. By moving the cleaning device back and forth in the cleaning fluid, soiling is washed out of the cleaning textile and remains in the cleaning fluid. Subsequently, the mopping device is withdrawn from the first slot into the open and introduced into the wringing station through a second slot. Herein, the cleaning textile scrapes across a scraper lip protruding in a barb-like configuration. This scrapes the fluid from the cleaning textile into the wastewater tank.

A drawback with this system is that soiling washed out of the cleaning textile in the cleaning station remains in the cleaning station. As the operating hours increase, the soiling of the cleaning fluid also increases so that with an insufficiently cleaned cleaning textile only an insufficient cleaning can be achieved when using the mopping device.

SUMMARY

In an embodiment, the present disclosure provides a combined cleaning and wringing system, comprising a mopping device including a cleaning textile to be cleaned and wrung, a cleaning station, and a wringing station. The cleaning station and the wringing station are spatially combined in a housing and the cleaning station comprises a cleaning fluid tank filled with a cleaning fluid, a pump and at least one spray head. The cleaning fluid tank, the pump and the spray head are in fluid communication and the wringing station includes at least one scraper having at least one scraper lip, across which the cleaning textile can be passed. The cleaning station and the wringing station are configured to be functionally separate, in that the cleaning fluid tank is only associated with the cleaning station and in that the wringing station comprises a wastewater tank, which is only associated with the wringing station, and in that there is no fluid communication between the wastewater tank and the cleaning fluid tank.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

In the drawings.

DETAILED DESCRIPTION

Figure 1:
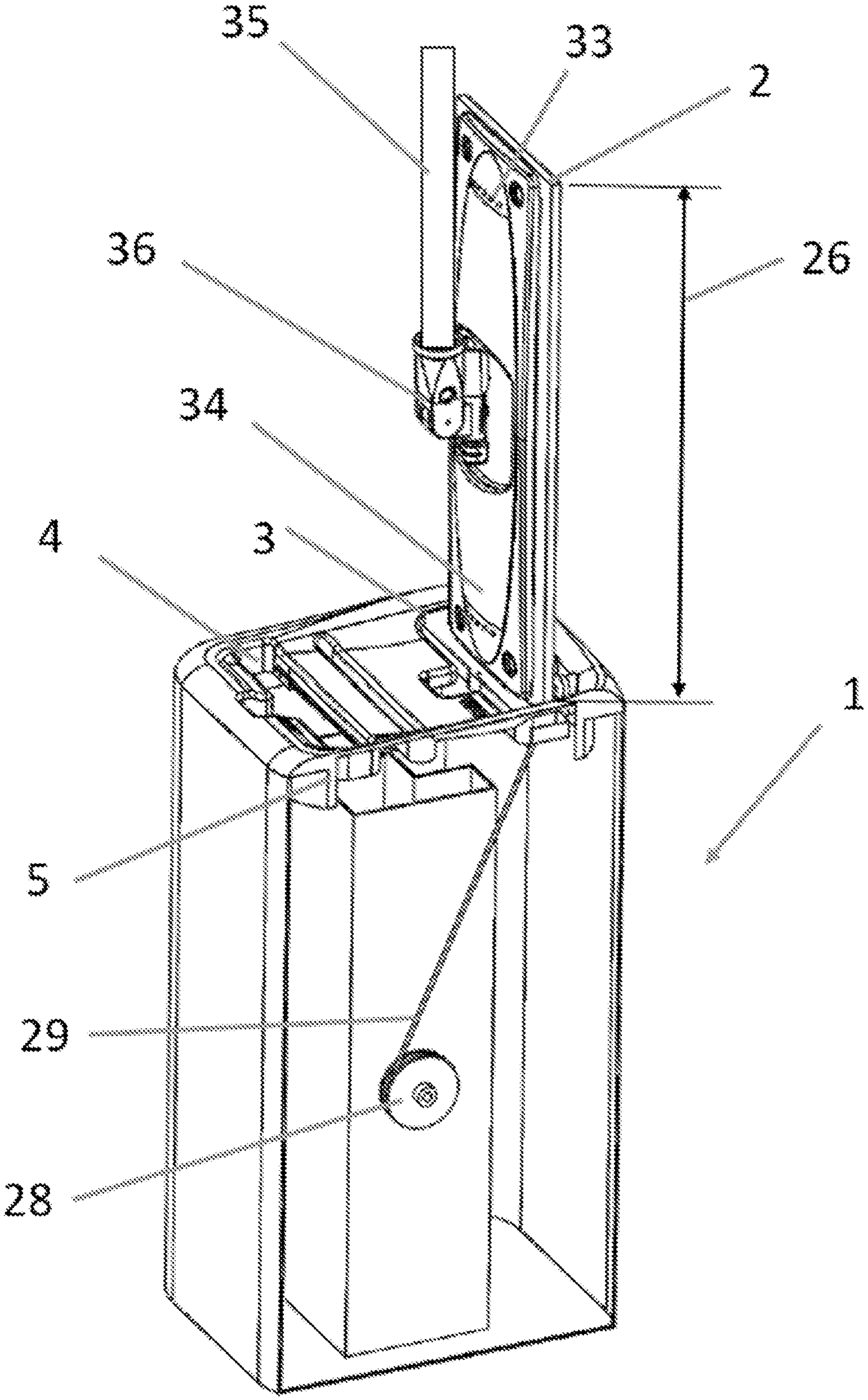
FIG. 1 schematically illustrates a perspective view of an embodiment.

In an embodiment, the invention provides a combined cleaning and wringing system in which the cleaning of the cleaning textile is improved in the cleaning station, in which the system has a constant level of good usage properties during long operating hours and in which the cleaning textile can be cleaned in the cleaning station several times in succession as needed without having to wring it in the wringing station in between, or can be wrung several times in succession in the wringing station without having to clean it in the cleaning station in between.

In an embodiment, a cleaning system is disclosed wherein a cleaning station and a wringing station are spatially combined in a unit, wherein the cleaning station comprises a cleaning fluid tank filled with a cleaning fluid, a pump and at least one spray head, wherein the cleaning fluid tank, the pump and the spray head are in flow communication with each other and wherein the wringing station comprises at least one scraper comprising at least one scraper lip across which the cleaning textile can be passed.

In an embodiment, it is provided that the cleaning station and the wringing station are configured to be functionally separate, that the cleaning fluid tank is only associated with the cleaning station, that the wringing station comprises a wastewater tank only associated with the wringing station, and that there is no flow communication between the wastewater tank and the cleaning fluid tank. This is advantageous in that the use of the cleaning and wringing system according to embodiments of the present invention can be particularly well adapted to the conditions of the application in each case and has a constant level of good usage properties during long operating hours.

Designing the cleaning station and the wringing station to be functionally separate offers the possibility of cleaning a mopping device several times in succession as needed without having to wring it in between, or to wring it several times in succession without having to clean it in between. This is advantageous, for example, in cases where strong soiling has been picked up by the mopping device which cannot be washed out of the cleaning textile in the cleaning station in one pass. In such a case, the mopping device can be cleaned in the cleaning station in a plurality of passes. After the last pass, it is then wrung in the wringing station.

If, for example, moisture-sensitive flooring, such as parquet flooring, is to be mopped, the previously-cleaned mopping device can be wrung in the wringing station in a plurality of passes. This allows the possibility of adapting the residual moisture of the cleaning textile to the surface to be mopped.

For cleaning the cleaning textile as fast and as efficiently as possible using a small amount of the cleaning fluid, it is of considerable advantage that the cleaning fluid in the cleaning fluid tank does not come into contact with the wastewater, scraped from the cleaning textile, in the wastewater tank. Mixing of cleaning fluid and wastewater is thus not possible. The cleaning fluid thus remains free of soiling over the entire period of use of the system so that, under normal circumstances, one pass through the cleaning station is sufficient to clean the cleaning textile.

The cleaning station can include a first slot having a first inlet and the wringing station can include a second slot having a second inlet, each for the introduction of the mopping device. The operation of the cleaning and wringing system is thus particularly easy and clear. The second inlet of the second slot is always essentially free of soiling because the mopping device, before it is introduced into the second slot through the second inlet for wringing is taken out of the cleaning station in a cleaned state.

According to an advantageous embodiment, it can be provided that the cleaning fluid tank is arranged in the cleaning station in a manner allowing non-destructive release. This makes handling of the system easier. For filling the cleaning fluid tank, it can be simply removed from the cleaning station and installed again in the cleaning station after filling. Especially when the cleaning fluid tank has a relatively small volume in order to not negatively affect handling of the system by a heavy weight, it must be refilled more frequently. Ease of refilling of the cleaning fluid tank makes handling easier.

The wastewater tank can comprise a drain for draining the wastewater from the unit as needed. Such an embodiment also benefits ease of handling. The wastewater which is generated in the wringing station can thus be easily drained. The drain can comprise a valve, for example in the form of a water tap, which is arranged at the outside of the unit for simple operation by the user of the system. If the wastewater tank is to be drained, it is not necessary to flip over the entire unit; it is sufficient to open the valve and to drain the wastewater from the wastewater tank through the drain.

According to an advantageous embodiment, it can be provided that the pump is mechanical. In contrast to an electric pump, a mechanical pump has the advantage that it does not require any electrical energy for operation. The system designed with a mechanical pump can thus be used practically at any time and in any place. Moreover, it is advantageous that mechanical pumps are cheaply available in various designs having the most versatile usage properties. The entire cleaning and wringing system can thus be easily and cost-effectively manufactured. There is no need for cumbersome sealing off of electrical components against cleaning fluid or wastewater.

The pump can comprise a pump housing with a chamber and a piston arranged in the chamber that is spring-loaded by a spring. The spring ensures that, after fluid has been forced out from the chamber, it is automatically refilled with cleaning fluid ready for the next cleaning process. Moreover, the spring has the function, as will be explained in the following, of returning, an operating slide to its initial position for the operation of the pump.

The cleaning station can comprise an operating slide for operating the pump by introducing the mopping device into the first slot, wherein the operating slide is able to be reciprocated in the first slot by the movement of the mopping device. Handling of the cleaning and wringing system is thus particularly easy. The user uses the mopping device for easy operation of the pump. He or she operates the pump while remaining in an upright position without having to release the mopping device from his or her hand.

As long as the operating slide is moved from its highest to its lowest position in the first slot, the pump pumps cleaning fluid from the chamber through the at least one spray head for cleaning of the cleaning textile.

When the operating slide is moved from its lowest position out of the first slot, the chamber is filled with cleaning fluid for the next cleaning process. During filling of the chamber no cleaning fluid is pumped through the spray head. Such an arrangement can be easily and cost-effectively manufactured.

Alternatively, it is also generally possible to provide a double-acting pump. In such a case, the cleaning fluid would be sprayed through the at least one spray head during the movement of the operating slide from its highest position into its lowest position in the slot and in the reverse direction from its lowest position to its highest position in the slot onto the cleaning textile for cleaning.

The cleaning station can include a first slot having a first inlet and the wringing station can include a second slot having a second inlet, each for introducing the mopping device. This immediately makes it clear to the user that the cleaning station and the wringing station are functionally separate. For repeated processing of the mopping device in the cleaning station or in the wringing station, the mopping device is introduced into each station through the respective inlet.

The operating slide, during operation by means of the mopping device, can be moveable from the first inlet against the spring force of the spring from its highest to its lowest position. By these means, the cleaning station has a simple structure involving few parts.

The spring which is arranged in the pump presses the operating slide of the cleaning station back into its highest position, its initial position, after removal of the mopping device from the first slot.

The first slot has preferably a depth essentially corresponding to the dimension of the cleaning textile in the same direction. This ensures that when the mopping device is introduced into the first slot the entire surface of the cleaning textile is wetted with cleaning fluid.

The piston and the operating slide are preferably connected via a transmission.

Herein, it is advantageous that the transmission transforms the stroke of the operating slide to the stroke of the piston. As soon as the operating slide is moved from its highest position into its lowest position of the first slot, the piston in the pump is moved in accordance with the corresponding transmission ratio so that the movement of the piston forces out fluid from the chamber of the pump, and the content of the chamber is sprayed onto the cleaning textile to be cleaned through the at least one spray head.

The transmission can comprise a pulley and a cable looping around the pulley. The transmission thus has a simple construction, is cost-effective and works reliably during long operating hours of the system.

The stroke of the operating slide can be two to four times the stroke of the piston. Such a transmission ratio is well suited for most cleaning and wringing systems. In such a case, the pump has compact dimensions and a light weight, just like, as a result, the entire system.

The maximum stroke of the operating slide can be 30 to 40 cm. The maximum stroke of the operating slide essentially corresponds to the length of the cleaning textile to be cleaned in the same direction.

The chamber can have a storage capacity of 80 ml to 120 ml. The cleaning fluid tank can have a tank volume of between 1.51 and 2.51.

In such a system, the cleaning station can be operated about twenty times before the cleaning fluid tank is empty and has to be refilled with cleaning fluid. This is sufficient to be able to clean the floor space of apartments of average size without having to refill the cleaning fluid tank in between. The chamber and the cleaning fluid tank, due to their small volumes in each case have compact dimensions just like, as a result, the unit. Handling of the system, in particular of the unit, is thus simplified. The system can be quickly put into operation and can thus be easily used for the cleaning of small floorspaces now and then.

If a unit is used with the above-described small volumes, the structural volume of the unit approximately corresponds to that of a 10-liter bucket.

Particularly thorough cleaning of the cleaning textile in the cleaning station is achieved when at least two spray heads are arranged in a functionally parallel arrangement, wherein the spray heads are evenly spaced over the width of the first inlet. For many applications, it is advantageous to use three spray heads in the above-described arrangement. The use of at least two spray heads, in particular of three spray heads, achieves a good tradeoff between thorough cleaning of the cleaning textile and economical use of the cleaning fluid for an operating time of the system that is as long and as uninterrupted as possible.

The spray heads spray the cleaning fluid in atomized fashion onto the surface of the cleaning textile to be cleaned. The spray heads are preferably adjusted in such a manner that the entire surface of the cleaning textile to be cleaned is thoroughly wetted and thus cleaned.

In the second slot, a scraper lip can be arranged, having a width corresponding to the width of the second slot, wherein the scraper lip can have a barb-like configuration. The width of the second slot essentially corresponds to the width of the cleaning textile to be wrung so that a reciprocating movement of the mopping device in the slot results in the entire width of the cleaning textile being scraped and therefore wrung.

The scraper lip can be supported in the second slot to be pivotable in the movement direction of the mopping device in such a manner that, as the mopping device is introduced into the second slot, cleaning fluid is scraped from the cleaning textile and, during subsequent withdrawal of the mopping device from the second slot, the scraper lip lies flat against the previously scraped surface of the cleaning textile essentially without scraping action. The cleaning textile is only wrung during introduction of the mopping device into the second slot on the scraper lip then protruding in a barb-like configuration.

Herein, it is advantageous that the system, during withdrawal of the mopping device from the second slot, does not overbalance, for example is not lifted off the floor or upset.

The mopping device can be formed as a flat mop. Flat mops are generally known and comprise a support plate and a mop handle connected to each other via a cardan joint, wherein the cleaning textile and the support plate are fitted to each other in a manner allowing non-destructive release. The cardan joint enables the support plate, with the fitted cleaning textile, to be introduced into the slots of the cleaning or wringing stations, arranged in the longitudinal direction with respect to the mop handle and with one of the lateral sides of the support plate leading.

In an embodiment, the invention also relates to a unit of a cleaning and wringing system as described above. The unit comprises a cleaning station and a wringing station, which are spatially combined, wherein the cleaning station comprises a cleaning fluid tank filled with cleaning fluid, a pump and a spray head, wherein the cleaning fluid tank, the pump and the spray head are connected in flow communication and wherein the wringing station comprises at least one scraper with at least one scraper lip.

In an embodiment, it is provided that the cleaning station and the wringing station are configured to be functionally separate, that the cleaning fluid tank is only associated with the cleaning station, that the wringing station comprises a wastewater tank, which is only associated with the wringing station, and that there is no flow communication between the wastewater tank and the cleaning fluid tank. Such a unit has all the advantages previously mentioned and can be operated together with a suitable mopping device, for example the above-described flat mop.

DETAILED DESCRIPTION OF THE INVENTION

Figure 2:
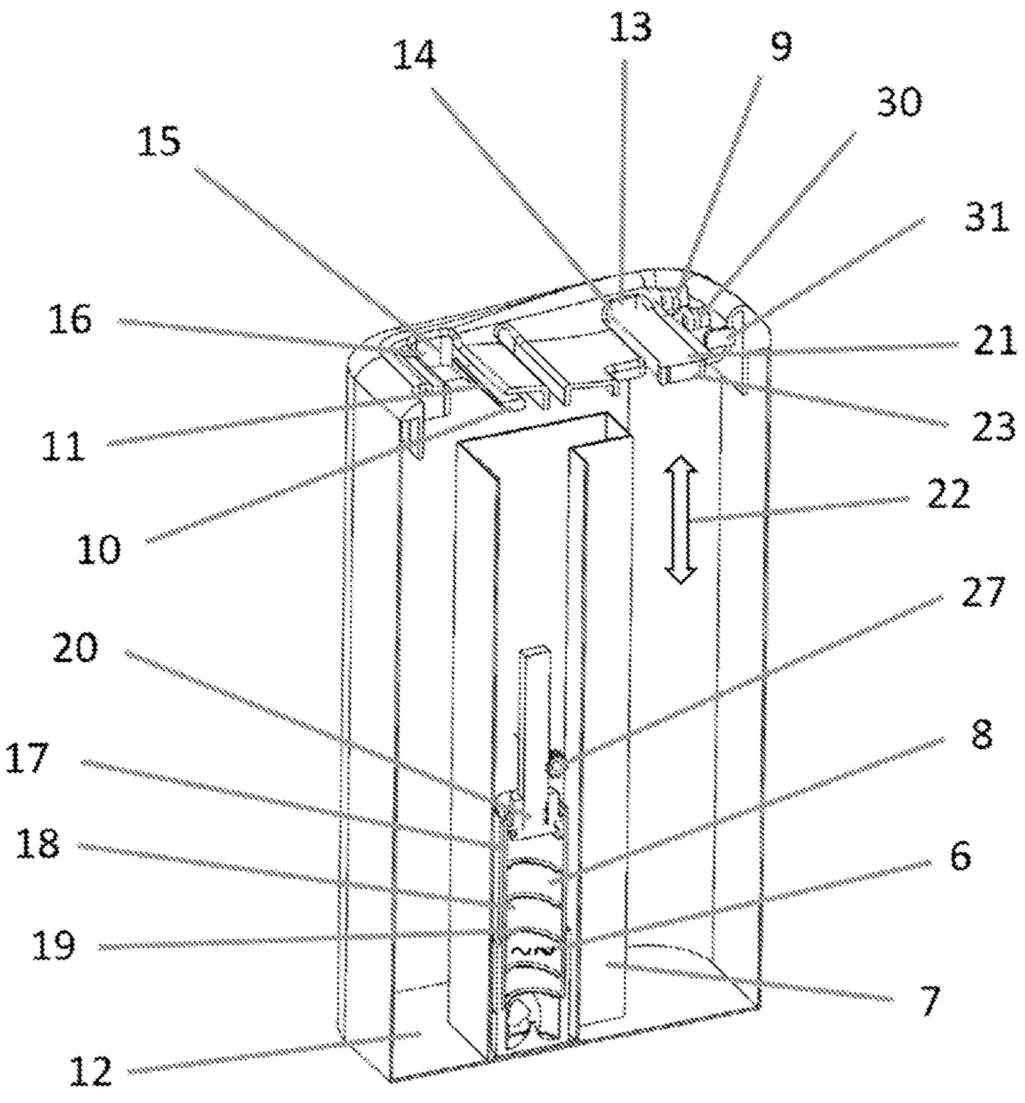
FIG. 2 schematically illustrates a sectional view of the system shown in FIG. 1 without operation by the mopping device.
Figure 3:
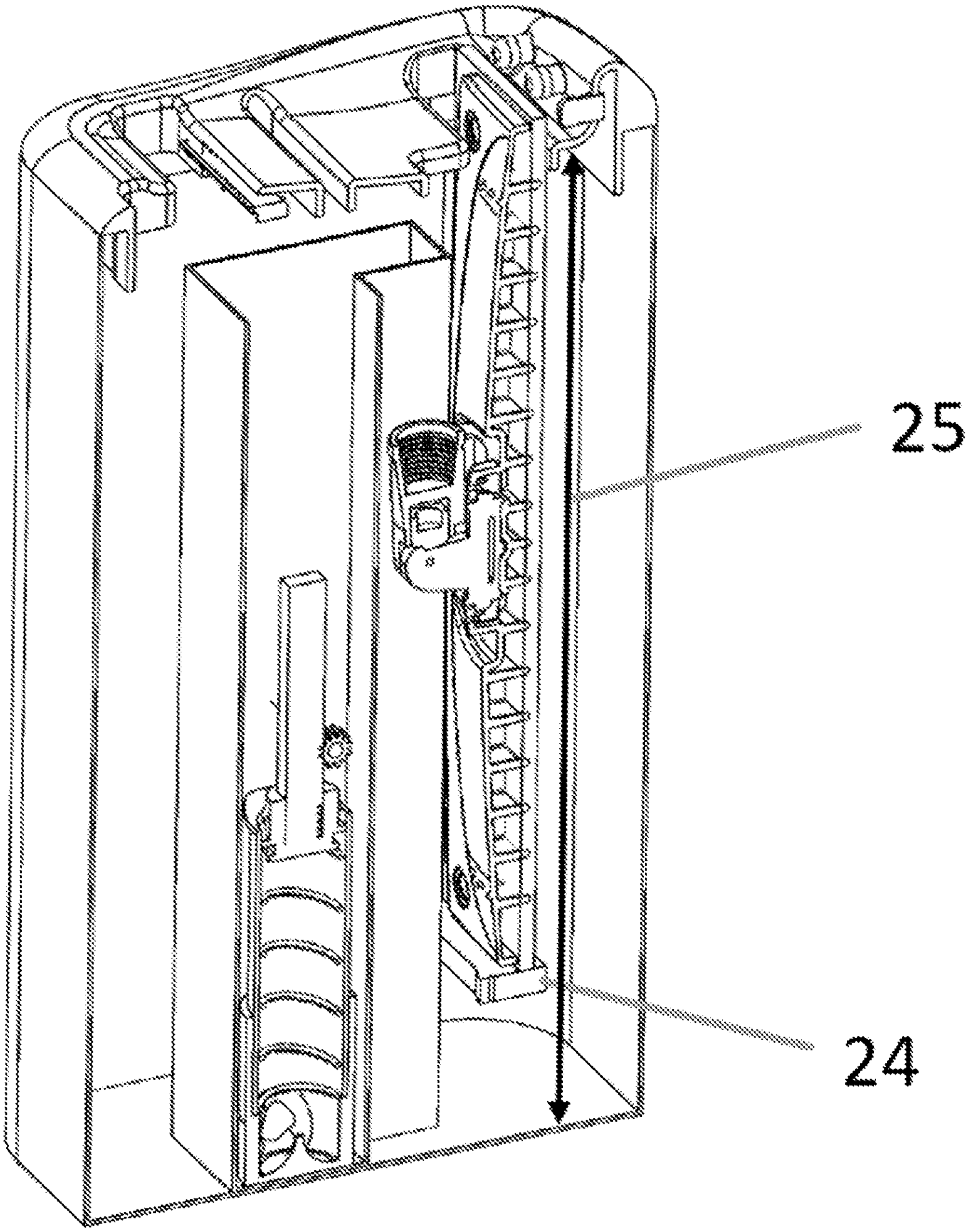
FIG. 3 schematically illustrates a sectional view, like FIG. 2, with the mopping device introduced in the cleaning station.
Figure 4:
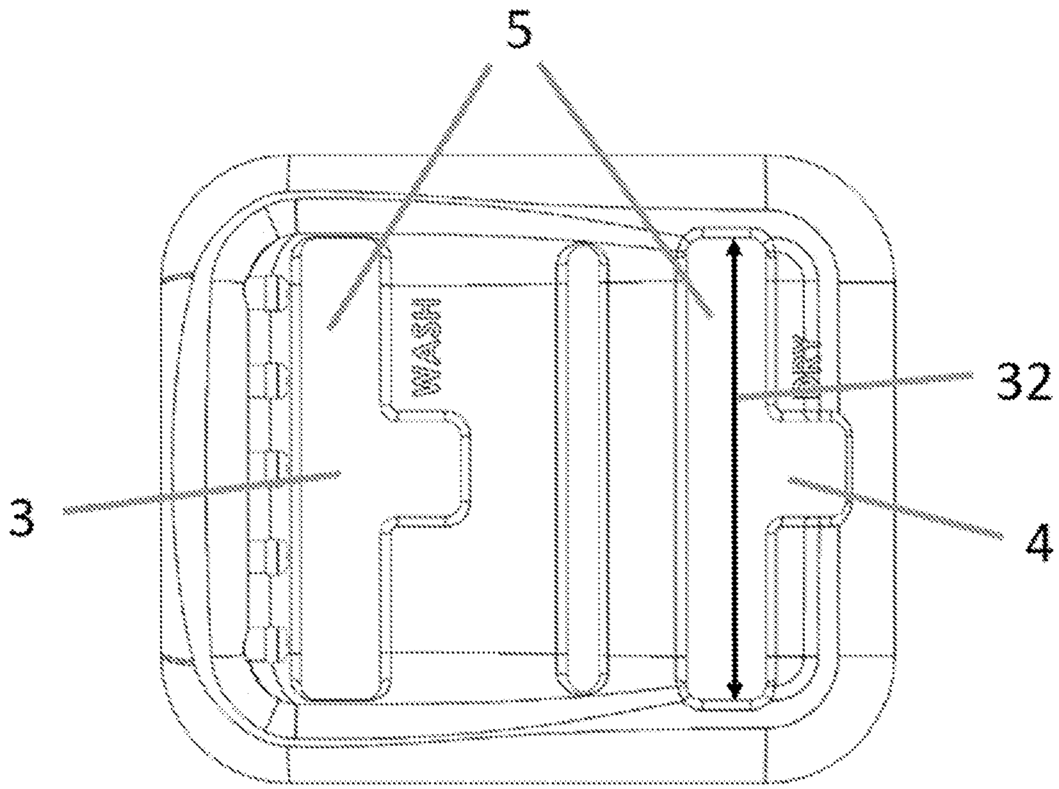
FIG. 4 schematically illustrates the unit shown in FIG. 1 in a plan view.

FIGS. 1 to 4 show an exemplary embodiment of the cleaning and wringing system according to an embodiment of the invention in a schematic view.

To improve clarity, not all of the reference numerals are indicated in all of the Figures.

The system comprises the mopping device 1, which is formed as a flat mop 33 and comprises the support plate 34 and the mop handle 35, which are connected to each other by the cardan joint 36. The cleaning textile 2 is attached to the support plate 34 in a manner allowing non-destructive release.

In addition to the mopping device 1, the system comprises the unit 5, in which the cleaning station 3 and the wringing station 4 are spatially combined and functionally separate from each other.

The cleaning station 3 comprises the cleaning fluid tank 7 which is filled with cleaning fluid 6. The cleaning fluid can be, for example, water with a cleaning and/or care product.

The cleaning station 3 also includes the pump 8 and, in the exemplary embodiment shown here, three spray heads 9, 30, 31 arranged directly above the first inlet 14 of the first slot 13. The three spray heads 9, 30, 31 are arranged to be functionally parallel and arranged to be evenly spaced over the width 32 of the first inlet 14. The width 32 of the first inlet 14 essentially corresponds to the width of the cleaning textile 2. The three spray heads 9, 30, 31 are arranged in such a manner that the entire width of the cleaning textile 2 is sprayed with atomized cleaning fluid 6.

The pump 8 is of a mechanical type and includes the chamber 18 within the pump housing 17. Within the chamber 18, the spring 19 is arranged, by which the piston 20 is spring-loaded. The spring 19 not only ensures that the piston 20 is returned to its initial position after spraying of the cleaning textile 2, and thereby the chamber 18 is refilled with cleaning fluid 6 from the cleaning fluid tank 7. The spring 19 also ensures that, after operation of the mopping device 1, the operating slide 21 is returned from its lowest position 24 to its highest position 23, its initial position.

In the exemplary embodiment shown, the maximum stroke of the operating slide is about 35 cm. The cleaning textile 2 has a corresponding length in the movement direction 22 of the mopping device 1. The chamber 18 has a storage capacity of about 100 ml, the cleaning fluid tank 7 has a tank volume of about 2 l. The unit 5 thus has compact dimensions and thus is also easy to handle by the user.

The operating slide 21 and the piston 20 are connected to each other via the transmission 27. The transmission 27 includes a pulley 28 around which the cable 29 is looped. The stroke of the operating slide 21, in the exemplary embodiment shown, is three times the stroke of the piston 20.

In the wringing station 4, the scraper 10 with the scraper lip 11 is arranged to scrape off excess fluid from the previously cleaned cleaning textile 2. The scraper lip 11, in the movement direction 22 of the mopping device 1, is directly behind the second inlet 16 of the second slot 15 and has a width corresponding to the width of the cleaning textile 2 in the same direction.

The scraper lip 11 has a barb-like configuration and is supported to be pivotable in the movement direction 22 of the mopping device 1 in the second slot 15 in such a manner that during introduction of the mopping device 1 into the second slot 15, cleaning fluid 6 is scraped off the cleaning textile 2. During subsequent withdrawal of the mopping device 1 from the second slot 15 the scraper lip 11 lies flat against the previously scraped surface of the cleaning textile 2 essentially without scraping action. The unit 5 thus remains securely standing while the mopping device 1 is withdrawn upwards from the wringing station 4.

The cleaning station 3 and the wringing station 4 are functionally separate from each other. This enables the mopping device 1 to be cleaned in the cleaning station 3 several times in succession without having to wring it in the wringing station 4 in between. Moreover, it is possible to wring the mopping device 1 several times in succession in the wringing station 4 in order to further reduce residual moisture in the cleaning textile 2.

Due to the functional separation of cleaning station 3 and wringing station 4 there is no flow communication between the wastewater tank 12 of the wringing station 4 and the cleaning fluid tank 7 of the cleaning station 3. The cleaning fluid 6 in the cleaning fluid tank 7 is thus always free of soiling, thus also allowing the cleaning textile 2 to be efficiently and thoroughly cleaned using only small amounts of cleaning fluid 6.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 mopping device
2 cleaning textile
3 cleaning station
4 wringing station
5 unit of 3 and 4
6 cleaning fluid in 7
7 cleaning fluid tank in 3
8 pump
9 spray head
10 scraper
11 scraper lip of 10
12 wastewater tank in 4
13 first slot in 3
14 first inlet into 13
15 second slot in 4
16 second inlet into 15
17 pump housing of 8
18 chamber in 8
19 spring in 8
20 piston of 8
21 operating slide in 3
22 movement direction of 1
23 highest position of 21 in 13
24 lowest position of 21 in 13
25 depth of 13
26 dimension of 2 in direction 25
27 transmission
28 pulley of 27
29 cable of 27
30 spray head
31 spray head
32 width of 14
33 flat mop
34 support plate of 33
35 mop handle of 33
36 cardan joint of 33

The invention claimed is:

1. A combined cleaning and wringing system, comprising:
a mopping device including a cleaning textile to be cleaned and wrung;
a cleaning station; and
a wringing station,
wherein the cleaning station and the wringing station are spatially combined in a housing,
wherein the cleaning station includes a cleaning fluid tank filled with a cleaning fluid, a pump and at least one spray head,
wherein the cleaning fluid tank, the pump and the spray head are in fluid communication,
wherein the wringing station includes at least one scraper having at least one scraper lip, across which the cleaning textile can be passed,
wherein the cleaning station and the wringing station are configured to be functionally separate, in that the cleaning fluid tank is only associated with the cleaning station and in that the wringing station includes a wastewater tank, which is only associated with the wringing station, and in that there is no fluid communication from the wastewater tank to the cleaning fluid tank such that a mixing of the cleaning fluid and stripped waste water is excluded and the cleaning fluid is free of impurities during an entire period of use of the combined cleaning and wringing system,
wherein the pump is a mechanical pump that does not require electrical power,
wherein the pump comprises a pump housing comprising a chamber and a piston arranged in the chamber and spring loaded by a spring,
wherein the piston and an operating slide are connected to each other via a transmission,
and wherein the transmission comprises a pulley and a cable looping around the pulley.

2. The combined cleaning and wringing system according to claim 1, wherein the cleaning station includes a first slot having a first inlet and the wringing station includes a second slot having a second inlet, each configured for introduction of the mopping device.

3. The combined cleaning and wringing system according to claim 2, wherein the cleaning station comprises an operating slide for operating the pump by introducing the mopping device into the first slot, and
wherein the operating slide is configured to be reciprocated in the first slot in a movement direction of the mopping device.

4. The combined cleaning and wringing system according to claim 3, wherein the operating slide, when operated by the mopping device and moved from the first inlet against a spring force of the spring, can be moved from a highest position to a lowest position.

5. The combined cleaning and wringing system according to claim 3, wherein the first slot has a depth corresponding to a dimension of the cleaning textile in a same direction.

6. The combined cleaning and wringing system according to claim 2, wherein in the second slot, the scraper lip is arranged having a width corresponding to a width of the second slot.

7. The combined cleaning and wringing system according to claim 6, wherein the scraper lip, is supported to be pivotable in the second slot in a movement direction of the mopping device such that, as the mopping device is introduced into the second slot, cleaning fluid is scraped off the cleaning textile and during subsequent withdrawal of the mopping device from the second slot, the scraper lip lies flat against the previously scraped surface of the cleaning textile without scraping action.

8. The combined cleaning and wringing system according to claim 1, wherein the cleaning fluid tank is arranged in the cleaning station and configured in a manner allowing destruction free release.

9. The combined cleaning and wringing system according to claim 1, wherein the wastewater tank comprises a drain for draining the wastewater from the housing as needed.

10. The combined cleaning and wringing system according to claim 1, wherein the transmission transforms a stroke of the operating slide to a stroke of the piston.

11. The combined cleaning and wringing system according to claim 10, wherein the stroke of the operating slide is two to four times the stroke of the piston.

12. The combined cleaning and wringing system according to claim 11, wherein a maximum stroke of the operating slide is 30 cm to 40 cm.

13. The combined cleaning and wringing system according to claim 1, wherein the chamber has a storage capacity of 80 ml to 120 ml.

14. The combined cleaning and wringing system according to claim 1, wherein the cleaning fluid tank has a tank volume of 1.5 l to 2.5 l.

15. The combined cleaning and wringing system according to claim 1, wherein at least two spray heads are arranged to be functionally parallel, and wherein the at least two spray heads are evenly spaced over a width of the first inlet.

16. The combined cleaning and wringing system according to claim 1, wherein the mopping device is a flat mop.

17. The combined cleaning and wringing system according to claim 16, wherein the flat mop comprises a support plate and a mop handle connected to each other via a cardan joint, and wherein the cleaning textile and the support plate are connected to each other in a manner allowing non-destructive release.

18. A cleaning device housing, comprising:

a cleaning station; and a wringing station, wherein the cleaning station and the wringing station are spatially combined in the housing, wherein the cleaning station comprises a cleaning fluid tank filled with cleaning fluid, a pump and a spray head, wherein the cleaning fluid tank, the pump and the spray head are connected in fluid communication, wherein the wringing station comprises at least one scraper with at least one scraper lip, wherein the cleaning station and the wringing station are configured to be functionally separate, in that the cleaning fluid tank is only associated with the cleaning station, wherein the wringing station comprises a wastewater tank which is only associated with the wringing station, and wherein there is no fluid communication from the wastewater tank and to the cleaning fluid tank such that a mixing of the cleaning fluid and stripped waste water is excluded and the cleaning fluid is free of impurities during an entire period of use of the cleaning device, wherein the pump is a mechanical pump that does not require electrical power wherein the pump comprises a pump housing comprising a chamber and a piston arranged in the chamber and spring loaded by a spring, wherein the piston and an operating slide are connected to each other via a transmission, and wherein the transmission comprises a pulley and a cable looping around the pulley.

* * * * *